United States Patent
Mueller et al.

(10) Patent No.: US 8,874,479 B2
(45) Date of Patent: Oct. 28, 2014

(54) SYSTEMS AND METHODS FOR TESTING A FINANCIAL TRADING SYSTEM

(71) Applicant: Miami International Securities Exchange, LLC, Princeton, NJ (US)

(72) Inventors: Kevin Mueller, Yardley, PA (US); Paul Fost, Pound Ridge, NY (US); Marc Hampshire, Williamstown, NJ (US); David Seidman, Maple Glen, PA (US); David Lehmann, Lumberton, NJ (US); Amy Neiley, Philadelphia, PA (US); Vinay Rao, Collegeville, PA (US); Greg Miller, Wallingford, PA (US); Ganesh Chittimalla, Plainsboro, NJ (US); Matthew Rotella, West Chester, PA (US); Douglas Schafer, Rose Valley, PA (US); Srinivas Nimma, Englishtown, NJ (US); Robert Straub, Kendall Park, NJ (US); Muna Tang, Dayton, NJ (US)

(73) Assignee: Miami International Securities Exchange, LLC, Princeton, NJ (US)

( * ) Notice: Subject to any disclaimer, the term of this patent is extended or adjusted under 35 U.S.C. 154(b) by 0 days.

(21) Appl. No.: 14/099,282

(22) Filed: Dec. 6, 2013

(65) Prior Publication Data
US 2014/0164208 A1    Jun. 12, 2014

Related U.S. Application Data

(60) Provisional application No. 61/734,238, filed on Dec. 6, 2012.

(51) Int. Cl.
*G06Q 40/00*    (2012.01)
*G06Q 40/04*    (2012.01)
*G06Q 10/06*    (2012.01)

(52) U.S. Cl.
CPC .......... *G06Q 40/04* (2013.01); *G06Q 10/0639* (2013.01)
USPC ......................................................... 705/37

(58) Field of Classification Search
CPC .................................................. G06Q 10/0639
See application file for complete search history.

(56) References Cited

U.S. PATENT DOCUMENTS

| 5,784,463 A | 7/1998 | Chen et al. |
| 2008/0016019 A1 | 1/2008 | Loftus et al. |

(Continued)

OTHER PUBLICATIONS

Kutvonen, L., "Trading services in open distributed environments," URL—http:/www.cs.helsinki.fi/u/summanen/thesis-4pdf.pdf, entire document, 1998.

*Primary Examiner* — Thomas M Hammond, III
(74) *Attorney, Agent, or Firm* — Cozen O'Connor

(57) ABSTRACT

A method is provided for testing a trading system having a verification subsystem and trading environments. Each of the environments has a network interface, memory, and a matching engine executed by a processor. The method includes retrieving, by the verification subsystem, at least one defined use case. Each defined use case includes command lines. The method also includes parsing the command lines based on defined parsing rules to produce parsed command lines. Each parsed command line includes a verb specifying financial transactions. Each parsed command line also includes data fields. The method further includes mapping the verb and fields of each command line based on defined mapping relationships to generate a test case. The method also includes executing the test case to generate messages to be executed by the trading system. The method also includes reading parameters of the trading system for comparison to specified validation values.

26 Claims, 8 Drawing Sheets

(56) References Cited

U.S. PATENT DOCUMENTS

| | | |
|---|---|---|
| 2009/0089263 A1 | 4/2009 | McHugh et al. |
| 2009/0198986 A1 | 8/2009 | Kissell et al. |
| 2009/0222508 A1* | 9/2009 | Hubbard ...................... 709/202 |
| 2009/0327153 A1 | 12/2009 | Milne |
| 2010/0100949 A1 | 4/2010 | Sonwane et al. |
| 2011/0093583 A1 | 4/2011 | Piemonte et al. |
| 2011/0131451 A1* | 6/2011 | Bosch ............................ 714/33 |
| 2012/0243745 A1* | 9/2012 | Amintafreshi ................ 382/103 |

\* cited by examiner

SYSTEMS AND METHODS FOR TESTING A FINANCIAL TRADING SYSTEM

CROSS-REFERENCE TO RELATED APPLICATIONS

This application claims priority under 35 U.S.C. §119(e) from U.S. Provisional Patent Application No. 61/734,238 filed on Dec. 6, 2012, which is hereby incorporated by reference herein in its entirety. This application is related to U.S. patent application Ser. No. 14/098,882, filed on Dec. 6, 2013, which is hereby incorporated by reference herein its entirety.

FIELD OF INVENTION

The present invention is related to systems and methods for financial trading system quality assurance. Specifically, the present invention is directed to systems and methods for automated testing of a financial trading system.

BACKGROUND

System Quality Assurance

The mission of system (e.g., software) quality assurance (QA) is to ensure the delivery of the highest quality production system that is free from defects and is complete in terms of meeting all of the functional features to be delivered. Objectives of system QA include building complete set of use-cases and establishing a solid testing approach that is structured to ensure the functional alignment of the delivered system (e.g., financial trading system) to the requirements associated therewith (e.g., rules associated with the financial trading system) and to ensure that such delivered system is free of defects. For example, software QA involves proactive participation in the review process of system requirements and functional specifications for the purposes of generating accurate and timely use cases for functional testing.

The objectives also include conducting and managing both automated and manual execution of use case tests. Manual testing includes the testing of the system without using any automated tool or any script. For example, testers take over the role of an end user and test the system to identify any unexpected behavior or defect (e.g., software bug). The testers use test plans, test cases or test scenarios to test the system to ensure the completeness of testing. Manual testing also includes exploratory testing wherein testers explore the system to identify errors in it. In automated testing the testers write scripts and/or use other types of executable software to test the system. Automated testing is particularly useful for quickly and repeatedly running the use-case(s) or test scenario(s), e.g., those which might otherwise be performed manually. Apart from regression testing, automated testing is also used to test the system from load, performance and stress points of view. Automated testing increases test coverage, improves testing accuracy, and saves time and costs in comparison to manual testing.

In order to meet these and other objectives of system quality assurance, the engineers developing and testing a system must generate a set of comprehensive test cases based on a set of complete use cases. Preparing use cases requires knowledge of high level functionality of the system. However, preparing test cases further requires knowledge of the detailed workings of the system. For this reason, the task of generating and updating comprehensive test cases based on evolving use cases is error-prone and requires substantial efforts on the part of the development and testing engineers.

Electronic Financial Trading

The trading of financial instruments has historically required face-to-face communication at predefined physical locations. The NASDAQ over-the-counter market for stocks was one of the first markets at which technology replaced physical interaction. Subsequently, most stock exchanges in the world, such as those in London, Tokyo, and Frankfurt, moved to electronic trading. Innovations in computing and communications make possible global electronic order routing, broad dissemination of quote and trade information, and new types of trading systems. New technology reduces the costs of building new trading systems, lowering the entry barriers for new competitors. Finally, improvements in communications technology enable faster order routing and market data transmission to a much larger group of participants. The growth in electronic trading systems on an international basis has been explosive, and new stock markets are almost exclusively electronic.

A trading system's market structure includes the set of rules governing its trade execution mechanisms and the amount of price and quote data that it releases and stores. Many diverse market structures exist. Three generic market structure types are a continuous limit order book, a single-price auction, and a trading system with passive pricing.

In an electronic limit order book, traders continuously post bids and offers on the system for other participants to view. A limit order is an order to buy a specified quantity of a security at or below a specified price, or to sell above a specified price. The order book displays orders and typically ranks them first by price and then by time. A limit order book does not generally display the user's identity, the order's entry time, or the period for which the order is good. A participant either initiates a trade with an order already on the order book or places a new limit order in the book. If a bid or offer is in the book and a participant enters an order on the other side of the market at the same price or better, the limit order book automatically and immediately matches the orders, and a trade occurs. The book can match incoming orders against more than one existing order.

In a single-price auction system, participants may submit bids and offers over a period of time, but the system executes all trades together at one price, at a single point in time. The system normally calculates the transaction price to maximize the total volume traded, given the bids and offers residing in the system. Bids and offers with prices at least as good as the system-calculated price are processed into trades, subject to a set of priority rules. This structure has variations, depending on order type and order information display. Some electronic trading systems determine trade prices by explicitly referring to other markets' pricing and sales activity: such trading systems, which have no independent price discovery mechanism and whose pricing is determined directly from a primary market, are referred to as passive or derivative pricing systems. Some systems allow for the possibility of price improvement by assessing market conditions in the underlying market and then pricing their trades at a price better than the best quote available on the underlying market at the time of order entry. Prices may vary through the trading session—if the system operates at the same time as its associated primary market—or may be fixed at a single level, such as the closing price for an afterhours trading session.

There are many types of financial instrument that can be traded electronically, including cash instruments, such as stocks, as well as derivative instruments, such as options. An option is the right either to buy or to sell a specified amount or value of a particular underlying interest, at a fixed price, by exercising the option on or before its specific expiration date.

The options markets provide ways in which many different types of market players can achieve their specific investment goals. Some option investors, for example, may be looking for long term or short term profits. Other option investors may be looking to hedge an existing stock or commodity position. An option is a financial instrument, also referred to as a derivative, and can itself be traded. It is termed a derivative because the option contract derives its price and value from the underlying asset (e.g., shares of stock, Futures contract, values of an index or indices) on which it is based, and the option value can fluctuate as the price of the underlying asset rises or falls in price. The option contract value can also be affected by other market conditions, such as changes in volatility and interest rates.

There are two types of options—i.e., call options and put options. A call option is a contract that gives the buyer of the option the right, but not the obligation, to purchase a fixed number of contracts or shares of the underlying asset at a fixed price, on or before a set date. A put option, on the other hand, is a contract that gives the buyer of the option the right, but not the obligation, to sell a fixed number of contracts or shares of the underlying asset at a fixed price, on or before a set date. The strike price, also referred to as the exercise price, is the price at which the underlying asset may be bought by the holder of a call or sold by the holder of a put. The expiration date is the date on which an option expires. Options held to this date but not exercised cease to exist. The price paid for an option is called the premium of the option and it is the price paid by the buyer, and the price received by the writer (or seller) of the option. The premium is determined by a variety of pricing factors and open market transactions.

SUMMARY

According to an example embodiment, a method is provided for testing a computerized trading system having a verification subsystem and one or more trading environments for performing the trading of financial instruments. Each of the trading environments has a communication network interface, storage memory, and a matching engine executed by a processor. The method includes retrieving, by the verification subsystem, at least one defined use case. Each defined use case includes one or more command lines. The method also includes parsing, by the verification subsystem, the command lines based on defined parsing rules to produce parsed command lines. Each parsed command line includes a verb specifying at least one financial transaction. Each parsed command line also includes one or more fields, wherein each field contains a parameter of the specified financial transaction. The method further includes mapping, by the verification subsystem, the verb and fields of each command line based on defined mapping relationships to generate a test case. The method also includes executing, by the verification subsystem, the test case to generate one or more messages to be executed by the trading system and one or more validations to be performed. The method further includes transmitting, by the verification subsystem, the messages which are executed in the one or more trading environments of the trading system. The method also includes reading, by the verification subsystem, parameters of the trading system specified by the validations for comparison to specified validation values.

According to another example embodiment, a system is provided for testing a computerized trading system having and one or more trading environments for performing the trading of financial instruments. Each of the trading environments has a communication network interface, storage memory, and a matching engine executed by a processor. The system includes a verification subsystem having a processor and a communication interface, and a memory, which is accessible by the verification subsystem, for storing one or more defined use cases comprising one or more command lines. The verification subsystem is configured to perform parsing of the command lines of a retrieved use case based on defined parsing rules to produce parsed command lines. Each parsed command line includes a verb specifying at least one financial transaction. Each parsed command line also includes one or more fields, wherein each field contains a parameter of the specified financial transaction. The verification subsystem is also configured to perform mapping of the verb and fields of each command line based on defined mapping relationships to generate a test case and executing the test case to generate one or more messages to be performed by the trading system and one or more validations to be performed. The verification subsystem is further configured to perform transmitting of the messages which are executed in the one or more trading environments of the trading system and reading of parameters of the trading system specified by the validations for comparison to specified validation values.

According to yet another example embodiment, a computer program product is provided. The computer program product includes a computer usable non-transitory medium having computer readable program code embedded therein, and the computer readable code includes instructions for executing the steps of a method for testing a computerized trading system having a verification subsystem and one or more trading environments for performing trading of financial instruments. Each of the trading environments has a communication network interface, storage memory, and a matching engine executed by a processor. The method includes retrieving, by the verification subsystem, at least one defined use case. Each defined use case includes one or more command lines. The method also includes parsing, by the verification subsystem, the command lines based on defined parsing rules to produce parsed command lines. Each parsed command line includes a verb specifying at least one financial transaction. Each parsed command line also includes one or more fields, wherein each field contains a parameter of the specified financial transaction. The method further includes mapping, by the verification subsystem, the verb and fields of each command line based on defined mapping relationships to generate a test case. The method also includes executing, by the verification subsystem, the test case to generate one or more messages to be executed by the trading system and one or more validations to be performed. The method also includes transmitting, by the verification subsystem, the messages which are executed in the one or more trading environments of the trading system. The method further includes reading, by the verification subsystem, parameters of the trading system specified by the validations for comparison to specified validation values.

BRIEF DESCRIPTION OF THE DRAWINGS

The following description, given with respect to the attached drawings, may be better understood with reference to the non-limiting examples of the drawings, wherein.

DESCRIPTION OF THE PREFERRED EMBODIMENTS

Figure 1:
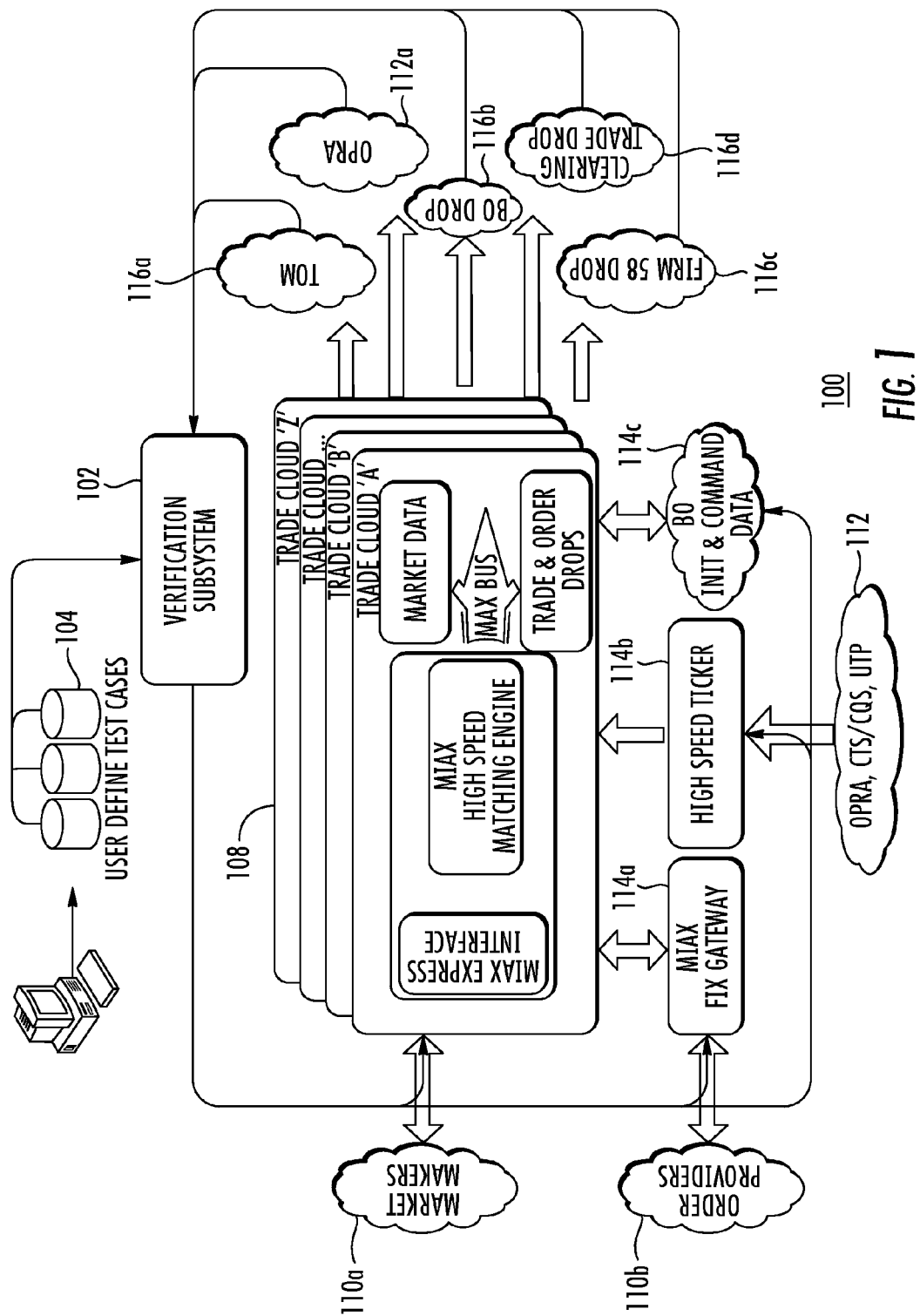
FIG. 1 is a block diagram showing a trading environment including a financial trading system with automated testing capabilities in accordance with one embodiment of the disclosed subject matter.

The present invention is directed to systems and methods for testing a financial trading system. More specifically, the present invention relates to systems and methods for conducting automated tests for a financial trading system. FIG. 1 is a block diagram showing a trading environment 100 including a financial trading system 108 with automated testing capabilities in accordance with one embodiment of the disclosed subject matter. The automated testing capabilities are implemented using a Verification Subsystem 102, which is a proprietary automated testing system. The Verification Subsystem 102 can take a set of predefined use-cases 104, which describe financial transactions to be tested and expected results of such tests, and generate one or more corresponding test cases that can be executed to test the financial trading system 108 running one or more instances of a trading application. The trading application may be running in a production mode. It may also run in a testing mode.

The Verification Subsystem 102 is designed to automatically and repeatedly execute test cases, which are generated based on the use-cases 104, on the financial trading system 108 at critical junctions during a system development life cycle—e.g., after an interim build to checkpoint the integrity of an ongoing development effort, following an installation of patch(es) to fix a defect, during routine QA testing prior to promoting the trading system to production, etc. The Verification Subsystem 102 treats the financial trading system 108 as a black box by connecting to the financial trading system 108 interfaces (e.g., FIX Gateway 114a, High Speed Ticker 114b, BO Init & Command Data 114c) as customers (e.g., market makers 110a, order providers 110b) or other participants (Options Price Reporting Authority (OPRA), Unlisted Trading Privileges (UTP), Consolidated Tape System (CTS)/Consolidated Quotation System (CQS) 112).

Upon connecting to the financial trading system 108 interfaces as customers 110 or other participants 112, the Verification Subsystem 102 converts each use-case 104 to corresponding test case(s) using a Verify Tool Parser (VT Parser), as discussed in further detail below (see FIG. 3), executes the test cases to interact with the trading system 108 to initiate and record trading activity, and subsequently checks the expected results of the tests against the actual results that are received from, e.g., OPRA 112a, ToM 116a, Binary Option (BO) Drop 116b, Firm 58 Drop 116c, and Clearing Trade Drop 116d.

Referring to FIG. 1, the financial trading system 108 includes a plurality of trading clouds, and each cloud, i.e., collection of components (trade clouds A-Z), is operationally independent from all other clouds such that all operational commands, controls and monitoring tools are "cloud aware." Each cloud may thus easily be identify and operate individually or collectively. Additionally, the electronic trading system 108 has a structured cloud configuration model that greatly facilitates a process for instantiating additional clouds.

By virtue of the trading cloud approach and the operational support built into an operations configuration and command suite of example embodiments, the electronic trading system 108 has the built-in capability to readily scale the trading capacity as the demand for performance increases. A cloud is a logical grouping of services hosted on shared infrastructure and controlled internally within Data Centers facilitating trading on predefined groups of options, and selected core applications (or multiple instances of the same application) are "cloud specific" and other applications are designed to be "cloud agnostic."

For example, market makers 110a (e.g., quoting firms) may submit quotes to, and receive information from, the matching engine running on the financial trading system 108, by communicating with the financial trading system 108. The trading application running on the financial trading system 108 receives quotes, typically block quotes, from market makers 110a, and stores the quotes in a shared memory accessible by the matching engine for use, e.g., in matching, by the matching engine, the received quotes with contra-side orders. Thus, as can be seen in the figure, each cloud is configured to facilitate bidirectional communication with market makers 110a using the trading application.

Order providers 110b, on the other hand, communicate indirectly with the cloud via a FIX interface gateway 114a. Unlike the trading application, the FIX interface gateway 114a is not specific to a cloud: rather it is used by all the clouds. The FIX interface gateway 114a has logic that determines the symbol associated with the received orders and routes the orders to the IP address of the appropriate cloud. Thus, for example, the FIX interface gateway 114a has a look up table to associate the symbol, cloud, and IP address of the cloud, and then transmit the order to the appropriate IP address in the message to be sent to the cloud (and matching engine) on which the order will be executed.

Each cloud's matching engine additionally receives information about the current state of the market from the high speed ticker 114b, which forwards quote information from OPRA, CTS/CQS and UTP, for example to ensure that the matching engine is informed of the situation in the market as a whole. The matching engine can also access this market information from a shared memory.

The matching engine provides market data to outside of the financial trading system 108, for example for customers that may wish to take or hit an order resting on the system's book. For this purpose, each cloud, based on the activity of the matching engine, updates a top of market feed (TOM) 116a, which is provided, based on all of the information received by, and matching performed by, the matching engine, via the market data. The same information is also provided to OPRA 112a, as required by U.S. trading regulations.

The architecture supports multiple instances of the trading application on a single cloud. The matching engine and outbound OPRA Feed applications are cloud specific, having at least a single instance per cloud. Fix Order Interface applications, which provide an order entry interface and routing to the appropriate cloud application and other similar applications, are cloud agnostic because they are run or executed outside of any specific cloud. The trading environment 100 having a cloud-based architecture can advantageously provide maximum flexibility from a scalability and performance point of view.

Incoming information as to the state of the market is received by the matching engine from the high speed ticker 114b, which includes, e.g., OTP, CTP and UTP information, developed from OPRA, CTS/CQS and UTP information sources 112. Completed trades are dropped to the Firm 58 drop 116c for billing. All orders, trades, reference data and BBOs are sent to the BO (Back Office) Drop 116b for storage in the back office of the trading system.

Data published/disseminated from each cloud is available for consumption on a central messaging bus backbone. This backbone is shown in more detail in figures below and is shown highly schematically as Max Bus in FIG. 1. Different applications, based on their business logic, subscribe to the messages disseminated and perform their required actions responsively thereto. The central messaging backbone architecture facilitates reduced latency and allows for more scalability as needed. Each application has discrete functionality and, in case of any unexpected erroneous behaviors, becomes less complex to recover functionality accordingly.

The cloud architecture further lends itself to optimized symbol balancing which ensures that each matching engine can consistently cater to different spikes in quote throughput rates and trading volume on, e.g., a certain option(s) class. Each cloud also sends trade data to the clearing trade drop 116d, which performs an entitlement based clearing trade interface for trading participants. The results of the clearing are sent to the trading firms.

Figure 2:
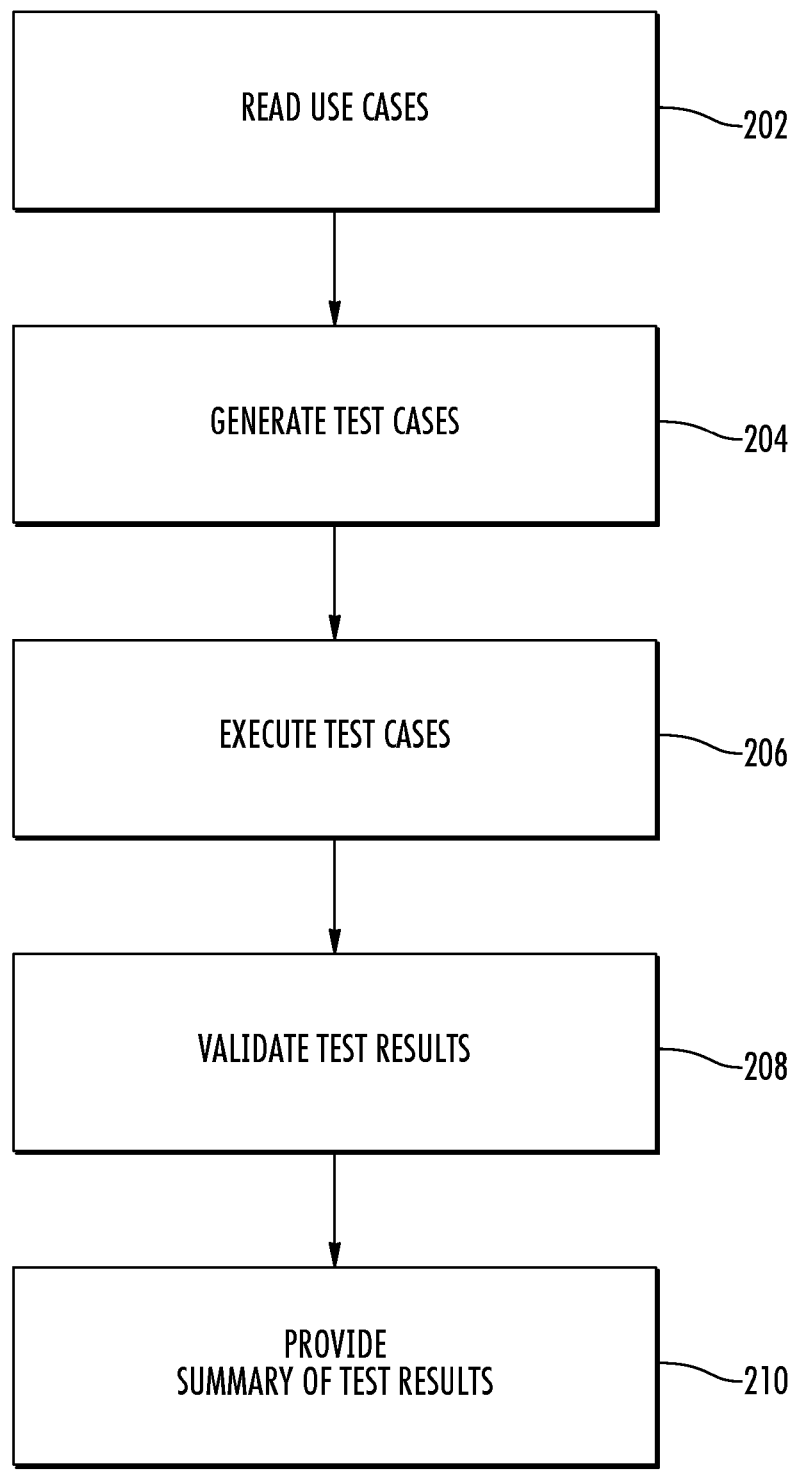
FIG. 2 is a flow diagram for an automated testing process in accordance with one embodiment of the disclosed subject matter.

FIG. 2 is a flow diagram for an automated testing process 200 in accordance with one embodiment of the disclosed subject matter. At 202, the Verification Subsystem 102 reads use cases 104 from a stored set of use cases. The use cases 104 are prepared by member(s) of a business team, as discussed in further detail below, and may be saved to a specified input directory for the financial trading system 108 or imported from a database. In some embodiments, the use cases 104 include one or more spreadsheet (e.g., Microsoft™ Excel™) files.

Table 1 shows an exemplary use case that is prepared to test the quoting interface of the financial trading system 108 by entering quotes by market maker 1 (MM1) and validating that the financial trading system 108 publishes its best bid and offer (BBO)—i.e., expected results—correctly. For instance, the financial trading system 108 is required to publish the quote over many interfaces for customers and the public for consumption.

TABLE 1

Use Case Example 1 for Best Bid and Offer Validations

| Action/verb | Side | Buy Quantity | Price | Validation |
|---|---|---|---|---|
| MM1 Quote | Buy | 10 | 1.00 | |
| MM1 Quote | Sell | 12 | 1.25 | |
| BBO | | | | 10 × 1.00 by 1.25 × 12 |

Table 2 shows a use case that is prepared to test a trade between a Quote Firm and an Order Flow Provider. This use case tests, among other things, whether Fill Reports can be communicated to the correct sessions of the financial trading system 108.

TABLE 2

Use Case Example 2 for Trade between a Quote Firm and Order Flow Provider

| Action/verb | Firm | Side | Quantity | Price |
|---|---|---|---|---|
| Quote | MM1 | Sell | 10 | 1.05 |
| Order | Firm 1 | Buy | 15 | 1.07 |
| Trade | MM1 and Firm 1 | | 10 | 1.06 |

At 204, the Verification Subsystem 102 generates one or more test cases based on each of the use case(s) 104 using the VT Parser, which may be a parsing engine that can parse the use case(s) 104, as described in further detail below (see, e.g., FIG. 3). The test cases so generated include instructions (e.g., commands) that, when executed by the Verification Subsystem 102, generate one or more messages to be executed by the financial trading system 108 as well as test data including input parameters for the messages/instructions. In some embodiments, the test cases include XML scripts. Table 3 shows an exemplary test case that is generated by the VT Parser based on the Use Case Example 1 shown in Table 1. The VT Parser reads each line in Use Case Example 1 and parses them to generate a more complex test case based on the trading rules and other pertinent system requirements.

TABLE 3

Test Case Example 1 for Best Bid and Offer Validations

| Command/instruction | Validation |
|---|---|
| 1. Send in the buy quote in the proper format to the quoting interface | Validate that the buy quote was acknowledged. |
| 2. Send in the sell quote in the proper format to the quoting interface | Validate that the sell quote was acknowledged. |
| 3. Validate the Client/ Public interfaces | a) For Proprietary Top of Market (ToM) feed, select the proper feed and validate all fields which are more than the input. b) For Industry required feed, select the correct transmission line(s). c) For Several Back Office collectors, determine which collector and validate fields. |

Table 4 shows a test case that is generated by the VT Parser based on the Use Case Example 2 shown in Table 2. For example, the VT Parser reads in a single Trade line and expands it to include the input interfaces, tape reporting required by regulations, clearing interface, and the back office.

TABLE 4

Test Case Example 2 for Trade between a Quote Firm and Order Flow Provider

| Command/ instruction | Validation |
|---|---|
| 1. Enter the Quote | Validate that client MM1 receives an acknowledgment. |
| 2. Enter the Order | Validate that client Firm 1 receives an acknowledgment. |
| 3. Validate the "fill" reports are correctly received | a) Validate that MM1 interface receives the fill message, and that it's properly formatted and all the MM1 clearing information is properly set. (This is not in the use case for the business logic the parser provides). b) Validate that Firm 1 interface receives the fill message, and that it's properly formatted and all the Firm 1 clearing information is properly set. |

TABLE 4-continued

Test Case Example 2 for Trade between a Quote Firm and Order Flow Provider

| Command/instruction | Validation |
|---|---|
| | (This is not in the use case for the business logic the parser provides).<br>c) Validate that MM1 and Firm 1 clearing session also see the "Fill" report, and determine which session this arrives based on dynamic configuration<br>d) Validate the Back Office receives notification of "Fill" report.<br>e) Validate the "Fill" is reported to regulatory authority.<br>f) Validate the "Fill" is received of market data customers. |

At 206, the Verification Subsystem 102 executes the test case(s). For example, the Verification Subsystem 102 sends messages (e.g., commands with input parameters and other test data) to one or more instances of the financial trading system 108 based on the test data and the sequence established in the test case file(s)—e.g., XML scripts including XML data.

At 208, the Verification Subsystem 102 validates the test results. For example, the Verification Subsystem 102 receives from the one or more individual instances of the financial trading system 108 output messages and compares the outputs contained in the output messages with the expected results that may be specified in the use cases 104 (e.g., Excel spreadsheet). At 210, the Verification Subsystem 102 provides a summary of all test cases that it has executed and the corresponding validation results.

Figure 3:
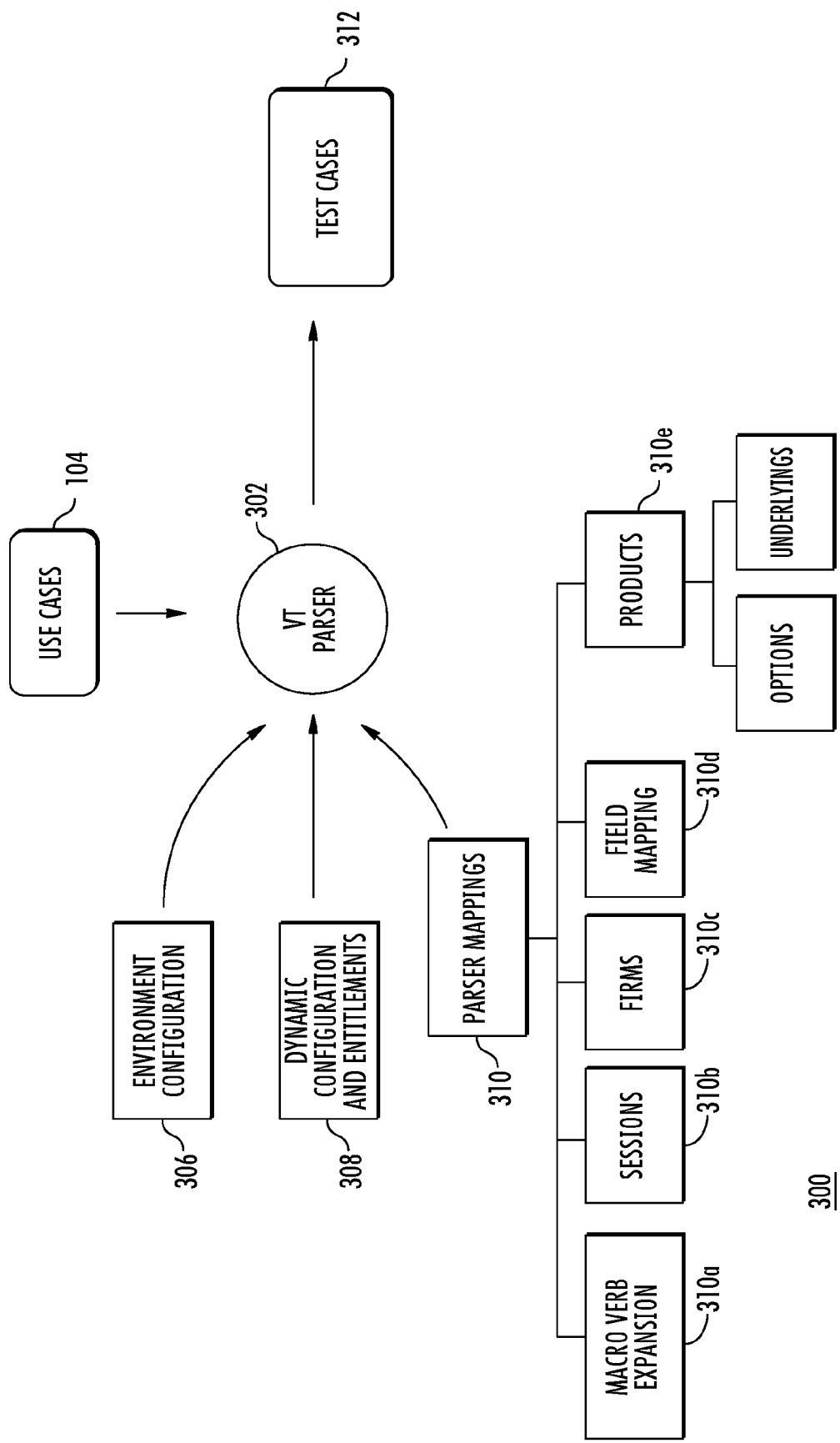
FIG. 3 is a block diagram showing a use-case parsing system in accordance with one embodiment of the disclosed subject matter.

FIG. 3 is a block diagram showing a use-case parsing system 300 in accordance with one embodiment of the disclosed subject matter. The use-case parsing system 300 provides the automated testing capability of the financial trading system 108, and includes a Verify Tool (VT) Parser 302. When the VT Parser 302 is first invoked by, e.g., the Verification Subsystem 102, the VT Parser 302 locates and imports static, environmental configuration 306, dynamic configuration 308, and a set of parser mappings 310. Once the VT Parser 302 finishes importing the static and dynamic configurations 306, 308 and the parser mappings 310, the VT Parser 302 starts reading in use cases 104 from a designated use case repository (e.g., one or more file directories or database tables) and parses each of the use cases 104 to generate detailed test case(s) 312 based on the imported configurations and parser mapping parameters as described in further detail below.

The VT Parser 302 performs its role in the quality assurance testing process by taking high-level use cases 104 that are developed by business or QA personnel and applying configurations (e.g., trading system configurations) to the use cases 104 to create very detailed and thorough test case(s). As shown in Tables 1 and 3, simple trade lines in Use Case Example 1 are expanded into multiple messages for distinct network connections using various message formats. For instance, "TRADE" may be a generic concept that can be expanded into several physical messages (e.g., 8 messages) that are communicated to other systems (e.g., the financial trading system 108, OPRA/UTP/CTS/CQS 112). This powerful feature allows operational personnel to prepare use cases at a high level of abstraction to test a financial trading system that is operating based on complex trading rules. In the "TRADE" example above, for instance, only one line may be used in a use-case to indicate that a trade is desired but the VT Parser 302 would create 8 messages using 40 different fields and validate all 40 fields across the 8 messages.

The static configuration 306 may include information regarding the environment in which a use case will be tested, such as memory allocation and queue depth settings of the financial trading system 108. In one embodiment, the memory allocation setting defines the size of the memory allocated for different subsystems of the financial trading system 108, and the queue depth setting defines the number of input messages or commands that the financial trading system 108 can receive and store before processing them. System settings, such as the memory allocation and queue depth settings, can be adjusted to tune the financial trading system 108 to operate well with other systems and to perform given trading tasks at an optimal level. The static configuration 306 may also include networking configurations, such as IP addresses and port numbers associated with fixed connection(s) that are maintained by the individual instances of the financial trading system 108, e.g., for receiving trade orders and market data and for providing outputs.

The dynamic configuration and entitlements 308 may include varying configurations for different operational modes of the financial trading system 108. An entitlement is used to describe the permission that a trading firm has with the financial trading system 108. Trading firms have different requirements for communicating with the financial trading system 108. For example, market maker 1 (MM1) may have two ports at the financial trading system 108 that can be used for receiving, e.g., quotes for trading from MM1, and market maker 2 (MM2) may have three such ports. These ports can be configured to receive or ignore different message types. For instance, MM1 may have one type of message (e.g., a "fill" message) sent to one of the two ports while MM2 may have the same type of message sent to all three ports. The VT Parser 302 can read these entitlements and use them to determine what to validate. For instance, a single trade line in a use-case between MM1 and MM2, when parsed by the VT Parser 302, can be converted to lines for four message validations in one operational environment/mode. In another operational environment, however, the entitlements may be configured differently for MM1 and MM2 if MM1 has two ports but MM2 has only one port to receive "fill" messages for filling orders. The VT Parser 302 is capable of enabling a same use case to be validated properly in both operational environments based on the entitlement setting of each of the operational environments.

The financial trading system 108 (also referred to as the Exchange system) is highly configurable. At any given moment, the financial trading system 108 may be running in one of several different operational environments (e.g., development environments, quality assurance environments, production environments) and the VT Parser 302 is capable of adapting to the trading system's changing operation environments. For example, the entitlements may change as the financial trading system 108 switches from one operational environment to the next, and the VT Parser 302 can adapt to such changes to increase or decrease the number of validations as the entitlements change.

The parser mappings 310 are generated based on the pertinent trading rules and the system requirements of the financial trading system 108, and provide information that the VT Parser 302 needs to map, as for example generic elements included in a high-level use case to specific elements that the financial trading system 108 can understand. Referring back to Table 1, for example, Use Case Example 1 uses a generic actor such as market maker 1 (MM1). However, there is really no such customer as market maker 1 who is registered with the financial trading system 108 to trade, e.g., options contracts. The VT Parser 302 maps such generic actor MM1 to a real, registered actor using the information provided by the parser mappings 310. In some embodiments, the parser mapping 310 includes an extensive set of mappings that define the entire interaction of the Exchange system (i.e., the financial trading system 108).

The parser mappings 310 include Macro Verb Expansion 310a, Sessions 310b, Firms 310c, Field Mapping 310d, and Products 310e, such as Options and Underlyings (underlying assets). The VT Parser 302 can take a simple direction/instruction from a use case (e.g., Trade) and expand it out to several testable actions using the Macro Verb Expansion 310a. Macro Verbs expand out to atomic verbs and pseudo verbs. Common actions in the financial trading system 108 can support different interfaces (e.g., a number of input parameters). For example, there are several types of Orders that require setting of different input fields (parameters). For a common action/verb having more than one set of input fields, pseudo verbs are used to keep the use cases 104 simple and concise but enable the VT Parser 302 to understand what a specific use case is trying to test.

For instance, an example of an atomic verb may be a "Fix Order." A "fix order" verb has many different fields to define an order. The financial trading system 108 uses different order types (e.g., Do Not Reduce (DNR) order, Immediate Or Cancel (IOC) order) that require populating a different set of fields. To help a use-case author, common-order types are mapped to pseudo verbs. For instance, the DNR order and IOC order can be mapped to pseudo verbs called DNR or IOC to make a use-case easier to read by, e.g., reducing the number of columns in the use-case. One may use the atomic verb "Fix Order" to send an IOC or DNR order, but doing so would require the use-case author to know the details of all necessary fields for sending an IOC or DNR order.

Each actor (e.g., registered customer) may use different network connections to communicate with the financial trading system 108. A use case may also include many different actors. The VT Parser 302 can map and assign specific connection(s) for each actor in a use case using the Session 310b. The VT Parser 302 can also map a generic trading firm and generic products in a use case to a specific trading firm that is registered with the financial trading system 108 and specific products that are traded through the financial trading system 108 using the Firms 310c and Products 310e. The VT Parser 302 can also map each data field in a use case to specific test data that is sent to or from the financial trading system 108 using the Field Mapping 310d.

Figure 4:
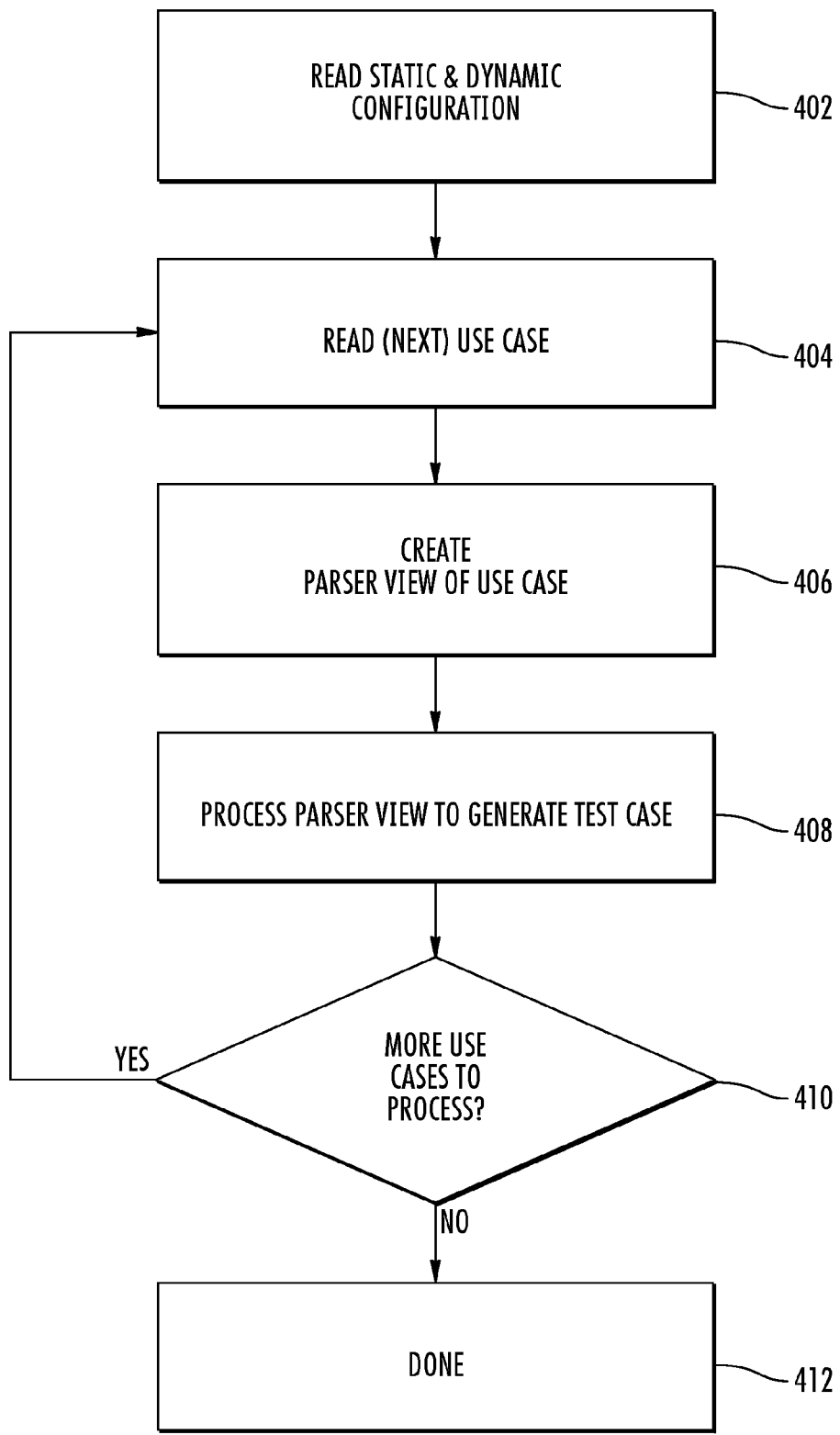
FIG. 4 is a flow diagram for a parsing process in accordance with one embodiment of the disclosed subject matter.

FIG. 4 is a flow diagram for a parsing process 400 in accordance with one embodiment of the disclosed subject matter. At 402, the VT Parser 302 reads in static configuration 306 and dynamic configuration and entitlements 308. In some embodiments, the VT Parser 302 is started when new or modified use cases become available for processing. At 404, the VT Parser 302 reads in a use case 104 from a use case repository.

At 406, the VT Parser 302 creates a parser view of the retrieved use case by parsing each line of the imported use case. For example, the VT Parser 302 reads in data from the use case and stores the data into data structures that it can better manage and handle. In some embodiments, for instance, the use cases 104 are provided as spreadsheet files (e.g., MST™ Excel™ spreadsheet files) and the VT Parser 302 is constructed based on the Python™ programming language. The Python™ based VT Parser 302 can create a parser view of a use case contained in an Excel™ spreadsheet file by reading in the use case data in the Excel file and storing them in data structures constructed using Python™

At 408, the VT Parser 302 generates one or more test cases from the retrieved use case by processing the parser view of the use case and outputs the generated test cases. For example, the VT Parser 302 can process and expand the parser view created at 406 based on the configurations and entitlements 306, 308, and store the data resulting from the expansion into a test case format. In some embodiments, the test cases are constructed as XML scripts. Generating one or more test cases from a use case is explained in more detail below in connection with FIG. 5.

At 410, it is determined whether there remains more use cases for the VT Parser 302 to process. If it is determined at 410 that there remains no more use cases for the VT Parser 302 to process, the parsing process ends at 412. If, however, it is determined at 410 that there remains more use cases for the VT Parser 302 to process, then the VT Parser 302 reads in the next use case from the use case repository at 404.

Figure 5:
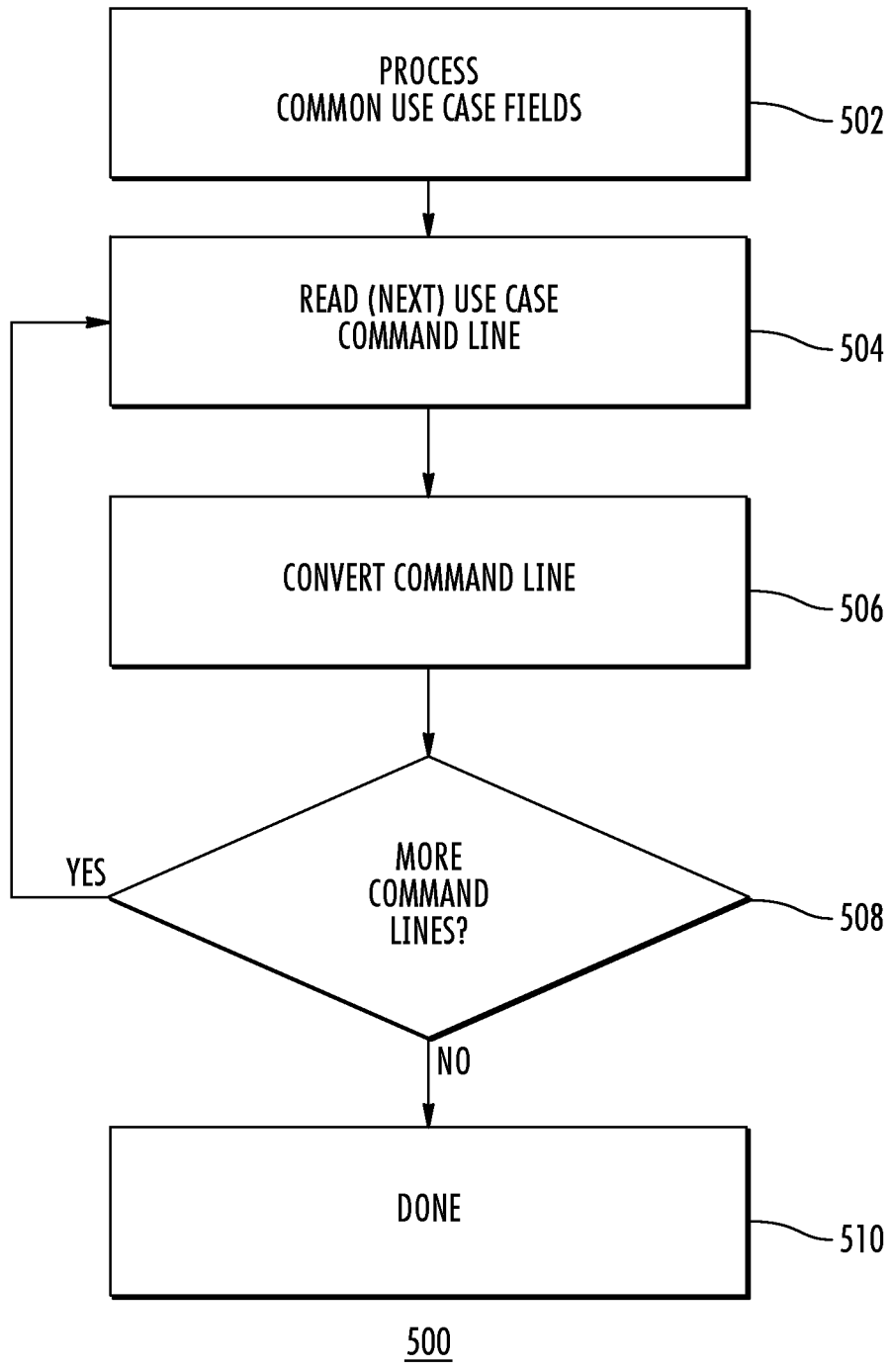
FIG. 5 is a flow diagram for a process of generating test case(s) from a use case for automated testing in accordance with one embodiment of the disclosed subject matter.

FIG. 5 is a flow diagram for a process 500 of generating test case(s) from a use case for automated testing in accordance with one embodiment of the disclosed subject matter. At 502, the VT Parser 302 processes common use case fields. The common use case fields refer to use case fields, such as the name/location of the relevant traceability matrix and the description of the use case, that are present in every use case. For example, the VT Parser 302 can map, or copy, the common use case fields into the corresponding test case(s).

In some embodiments, the VT Parser 302 determines whether the use case retrieved at 404 is found to have at least one corresponding, or matching, system requirement in a traceability matrix. In some embodiments, the traceability matrix is generated at run-time. If it is determined that the retrieved use case has no matching system requirement in the traceability matrix, the process may end and no test case(s) may be created from the use case.

At 504, the VT Parser 302 reads in each command line of the retrieved use case. For example, the VT Parser 302 can read in a row at a time from an Excel spreadsheet file including the retrieved use case. At 506, the VT Parser 302 converts the command line to one or more corresponding test case lines by expanding the command line based on the parser mappings 310. Converting the command line to the corresponding test case lines is explained in more detail below in connection with FIG. 6.

At 508, it is determined whether there remains in the retrieved use case more command line(s) for the VT Parser 302 to convert into test case lines. If it is determined at 508 that there remains no more command lines for the VT Parser 302 to convert into test case lines, the process 500 of generating test cases from a use case ends at 510. If, however, it is determined at 508 that there still remains one or more command lines of the use case to convert into test case lines, the VT Parser 302 reads in the next command line from the use case at 504 and converts the next command line at 506.

Figure 6:
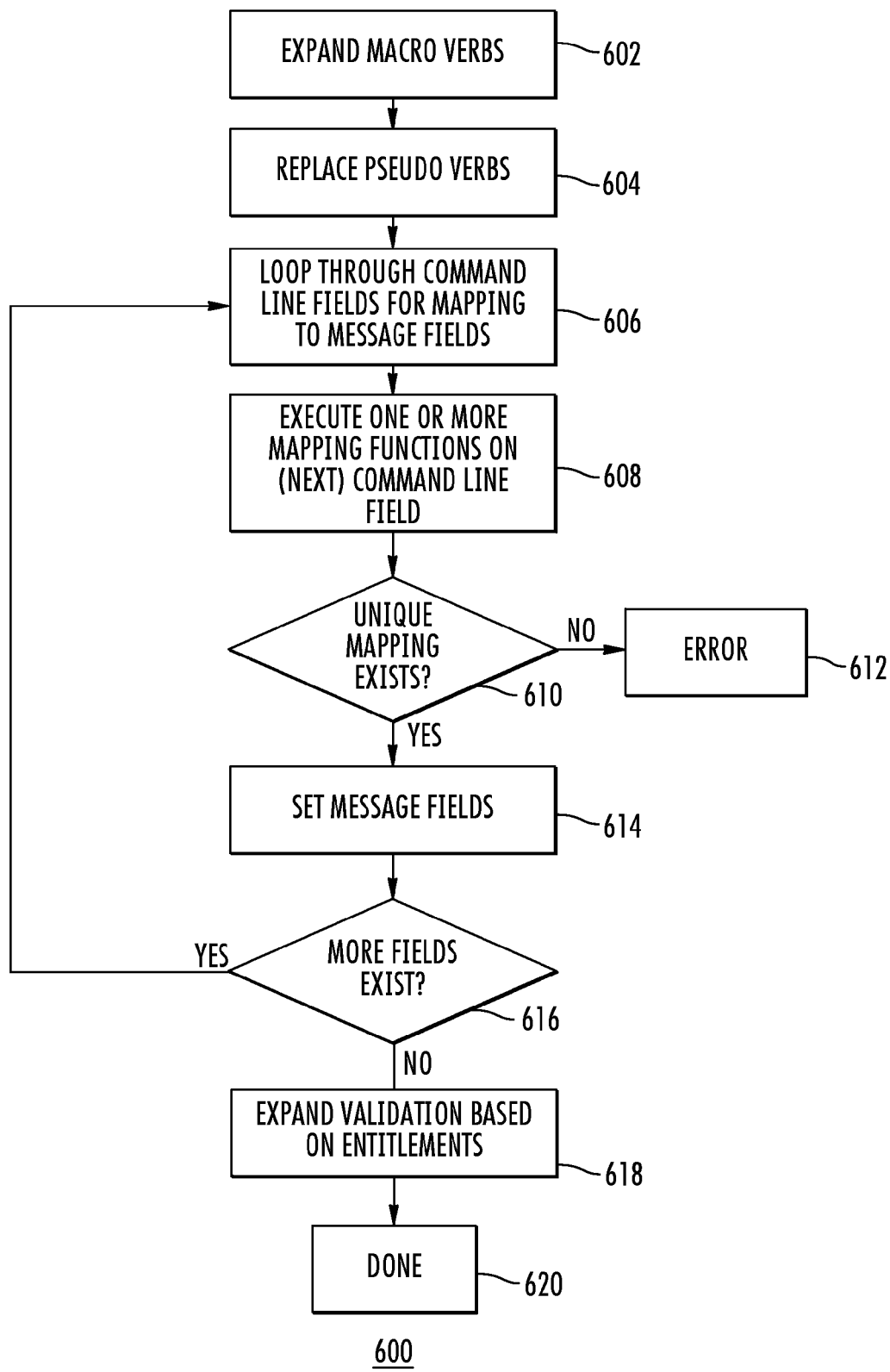
FIG. 6 is a flow diagram for a process of mapping use-case command lines to corresponding test case lines in accordance with one embodiment of the disclosed subject matter.

FIG. 6 is a flow diagram for a process 600 of mapping use-case command lines to the corresponding test case lines (e.g., automated script functions) in accordance with one embodiment of the disclosed subject matter. At 602, the VT Parser 303 expands macro verbs in the command line imported at 504. For example, the VT Parser 302 takes a simple direction expressed using a Macro verb in the use case command line and expands it out to several atomic/pseudo verbs for testable actions. It may be also determined at 602 whether the command line includes multi-sided verb(s), such as TRADE (which is multi-sided for having both buy-side and sell-side components). If it is determined that the command line includes a multi-sided verb, the VT Parser 302 expands the multi-sided verb by breaking, e.g., TRADE into a buy side and a sell side. At 604, the VT Parser 302 replaces pseudo verbs (if any) in the command line with appropriate testable action(s) in accordance with the values set in use case data fields.

At 606, the VT Parser 302 loops through all command line data fields for mapping the appropriate command line data to the data fields of the corresponding instruction(s) in the test case(s). At 608, the VT Parser 302 executes one or more mapping functions to map a command line data field to the data field(s) of the corresponding instruction(s) in the test case(s). At 610, it is determined whether a unique mapping function exists for each command line data field.

Mapping from use case data fields (e.g., Excel fields) to the corresponding test case instruction fields does not always involve one-to-one mapping. For example, depending on given macro verbs or pseudo verbs, the location of data to map can be in different locations in a use-case. In one embodiment, for instance, the format of use-cases is predefined, e.g., to enhance the readability of the use-cases. Where spreadsheet files are used for preparing the use-cases, for example, more than one column (e.g., Bid Price column, Ask Price column) may be used to define a field for "Price." However, a single order requires only one field called "Price." Thus, when generating a single order, the VT Parser 302 can map either the bid price column or the ask price column to the Price field. The Macro verb for the Order may expand out to several atomic or pseudo verbs that require different fields, and the VT Parser 302 maps one of several related columns in a use-case to the different fields across the multiple verbs that are used for expanding the Macro verb.

If it is determined at 610 that no unique mapping function is available for a command line data, an error is declared at 612 and the process 600 of e.g., mapping use case command lines to automated script functions ends. If, however, it is determined at 610 that a unique mapping function is available, the VT Parser 302 sets the corresponding test case instruction (e.g., message) fields using the unique mapping function at 614.

At 616, it is determined whether there remains more command line data fields for the VT Parser 302 to map to the corresponding test case instruction(s). If it is determined at 616 that there remains no more use case data fields, the VT Parser 302 expands the validations of test case data fields based on entitlements 308 at 618. For example, the VT Parser 302 can increase the number of the validations if doing so is necessary to test for all of the entitlements. The process 600 then ends at 620. If, however, it is determined at 616 that there still remains one or more command line data fields, the VT Parser 302 proceeds to 606.

Figure 7:
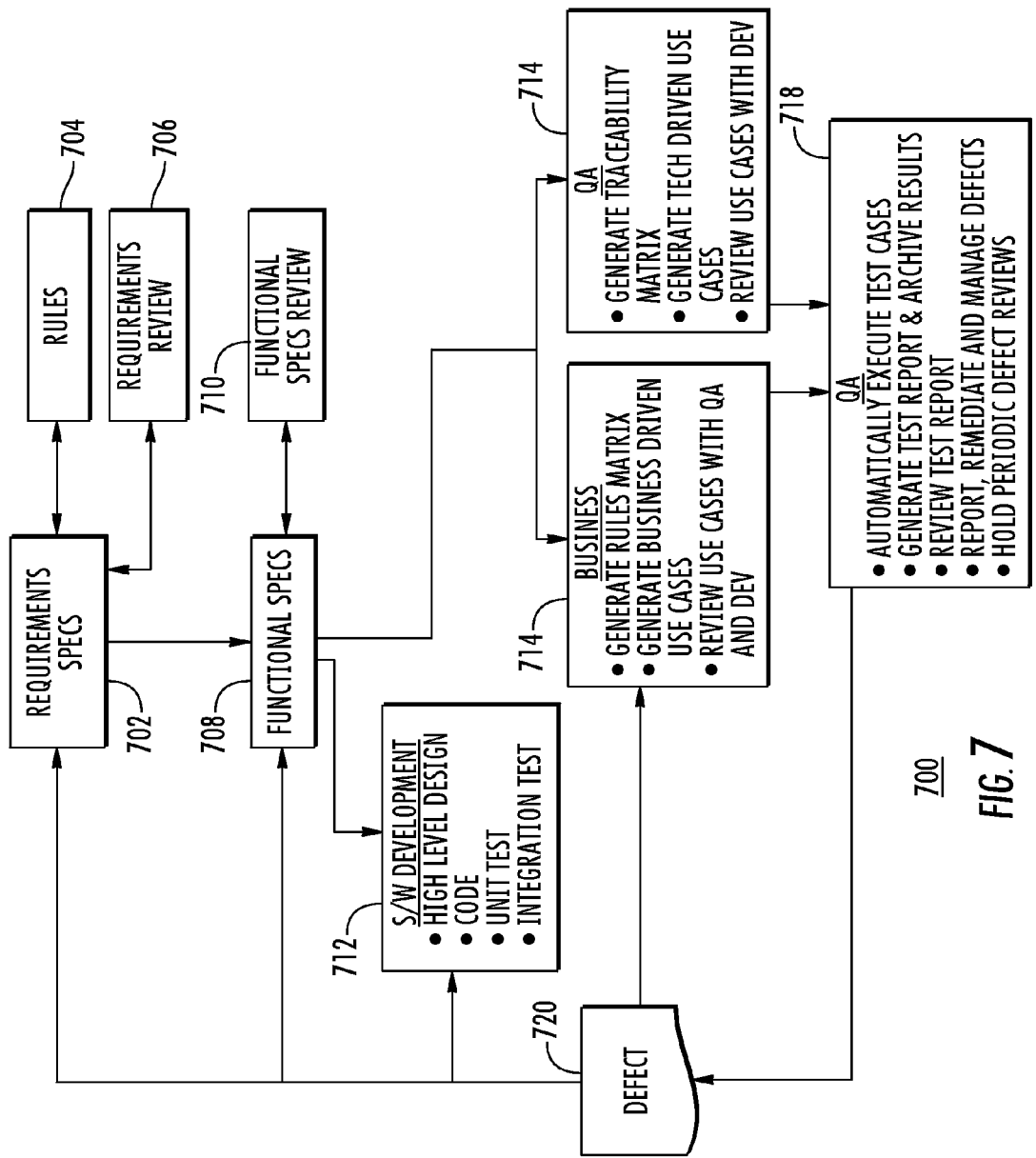
FIG. 7 is a block diagram showing a process for system quality assurance in accordance with one embodiment of the disclosed subject matter.

FIG. 7 is a block diagram showing a process 700 for software system quality assurance in accordance with one embodiment of the disclosed subject matter. Referring to FIG. 7, system quality assurance process 700 starts by producing a (business centric) system requirements specification of a trading application at 702. For example, a business team can work with a legal team to generate a system requirements specification for an option trading application. At 704, trading rules are generated. For example, the business team can work with the legal team to produce a set of trading rules based on the system requirements specification. Once the trading rules are generated, the rules can be reviewed by the business and legal teams. If necessary, the system requirements specification may be revised based on the review of the rules. There may be several iterations of such reviews and revisions.

At 706, the system requirements specification is reviewed. For example, the business team can deliver the system requirements specification to a development team and a quality assurance team for a review by the development and quality assurance teams. The development and quality assurance teams can meet with the business and legal teams after performing their own analysis of the system requirements specification to discuss potential implementation issues, such as undue complexity, performance implication and unexplored scenarios. The business team can revise and refine the system requirements specification and/or the trade rules based on the discussion. The development and quality assurance teams may also add technology-driven requirements to the system requirements specification, and the business team can review the technology-driven requirements to identify any unintended consequences that could impact the existing functionality.

At 708, a functional specification is produced. For example, the development team may generate a functional specification based on the system requirement specification. A functional specification may specify how the trading application will operate with regard to new or modified functionality. An automated testing tool that can be used by the quality assurance team to automatically test the trading application may also be considered at this phase to ensure the integrity of the testing tool. Because the testing tool may not be impacted by business functional changes in some cases, only requirements that modify external application messaging may need to be addressed in those cases.

At 710, the functional specification is reviewed. For example, the development and quality assurance teams may work with the business team for reviewing a draft functional specification produced at 708 to ensure alignment of the implementation and operational details with the system requirements. Refinements to the functional specification may be made based on the review.

At 712, the development team builds the trading application. For example, the development team can work with the quality assurance team to produce high level and detailed design of the trading application. Once the necessary designs are in place, the development team can start coding, or programming, modules and components that constitute the trading system. As the development team completes each module/component, the quality assurance team can conduct unit testing of the completed modules and components. As more application modules and components are coded and unit tested, the quality assurance team may also conduct integration testing of the unit tested modules and components as those modules and components are integrated.

At 714, business-functionality centric use-cases are generated. For example, the business team can make a parallel effort to develop use-cases that are related to business functionality and ascertain whether such business-functionality centric use-cases properly cross-reference the system requirements and the pertinent trading rules. The business centric use-cases may be peer-reviewed once they are generated. At 716, a traceability matrix is generated. For example, the quality assurance team can make a parallel effort to produce a traceability matrix showing, e.g., many-to-many relationships between the use-cases and corresponding system requirements. The quality assurance team may also develop technology-driven use-cases based on the functional specification. The quality assurance team may work with the development team to review the technology-driven use cases once they are generated.

At 718, the use-cases are executed. For example, both the business centric use-cases and the technology-driven use-cases, once completed and reviewed, may be executed using the automated testing tool. In the process of executing use-cases, the modules and components of the trading application, as well as the automated testing tool, can be thoroughly tested by running the automated test cases to successful completion. For instance, the automated testing tool may process the use-cases to convert the use-cases into appropriate test-cases and run the test-cases to generate test results. The test results so generated may be archived. The test results may also be analyzed to identify defects in the tested application.

At 720, defects identified during the automated testing are reviewed to locate the source of each of the defects. For example, the teams involved in designing, developing and testing the application may analyze the defects to trace each of the defects to its source (also referred to as root cause), categorize them according to the identified sources, and distribute the defects to appropriate team(s) to take appropriate remediation action to correct them. For instance, the business team may be assigned to the task of correcting a design defect that is caused by defect(s) in the system requirements or the trading rules. The development team may be assigned to the task of correcting a coding defect that is caused by defect(s) introduced to a component of the trading system during the coding phase. Some or all of the steps in the system quality assurance process 700 may be reiterated to refine the accuracy, reliability, robustness and efficiency of the trading application and to identify and correct defects. Validating corrections of the defects may involve regression testing in both unit and integration levels.

The system quality assurance process 700 provides steps that are sufficient to fulfill the objective of managing all aspects of the testing process including generating and maintaining use-cases, creating traceability matrices, tracking test failures and validating remediation efforts prior to certifying a trading application as defect free. The steps provided by the system QA process 700 are also sufficient to fulfill the objective of improving the testing process in terms of driving toward new efficiencies and enhanced accuracy of testing and of building and expanding on the knowledge of the trading application to support generating accurate and comprehensive use-cases to test both the logical function domain as well as the non-functional domain within the system on which the trading application runs.

The system QA process 700 also enables management of an automated testing facility (e.g., automated testing tool) to ensure that (1) all test cases are automatically generated and run against software release, (2) all test cases are current and comprehensive in testing scope, and (3) all test cases are properly archived along with corresponding test results.

Figure 8:
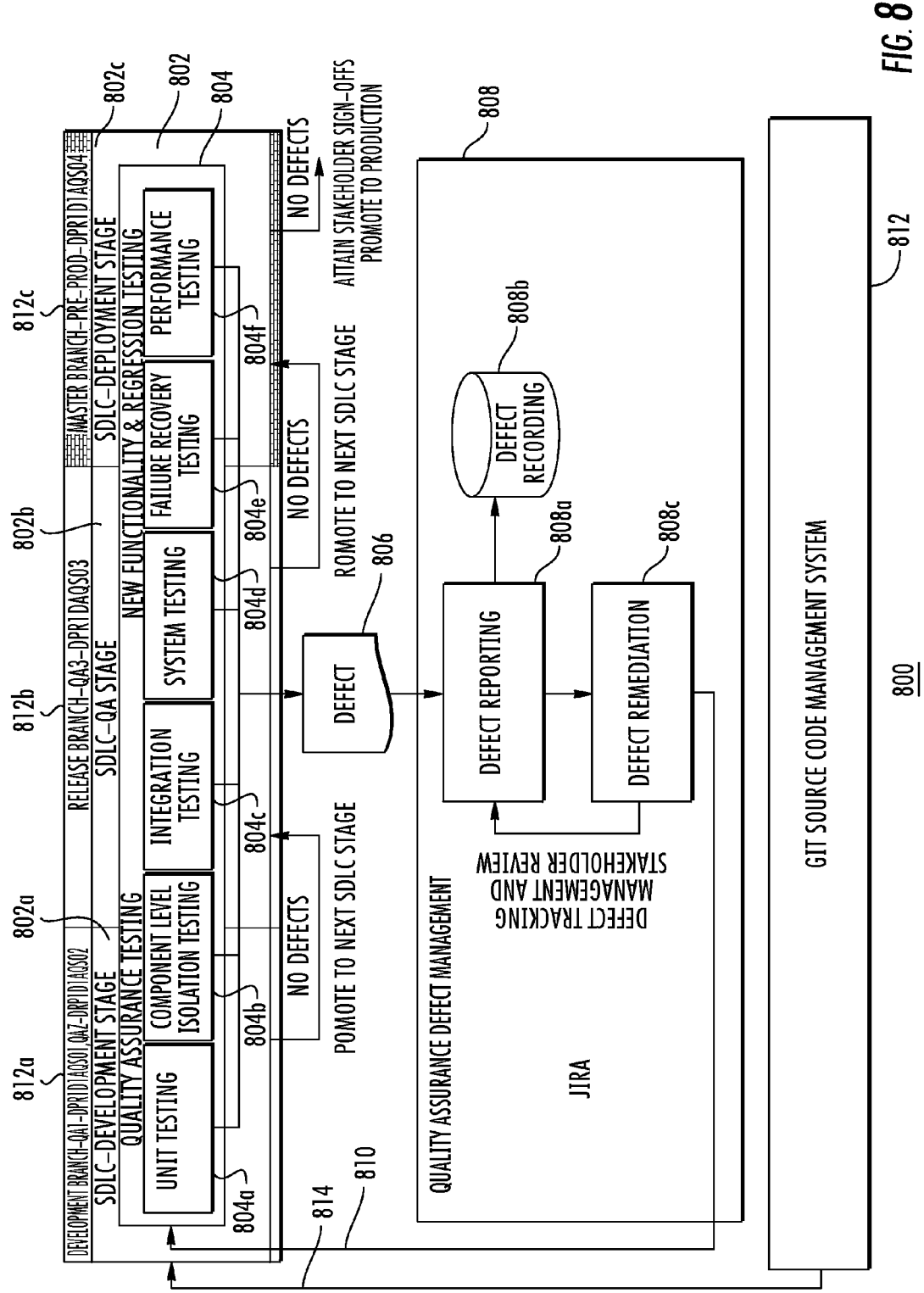
FIG. 8 is a block diagram showing a process for quality assurance defect management in accordance with one embodiment of the disclosed subject matter.

FIG. 8 is a block diagram showing a process 800 for quality assurance defect management in accordance with one embodiment of the disclosed subject matter. The QA defect management process 800 includes the steps of (1) identifying system defects (testing stage), (2) analyzing the identified defects (defect management stage), and (3) correcting the defects once the root cause(s) are identified (defect management stage). System defects, such as software bugs, can be introduced during various stages (e.g., development stage 802a, quality assurance stage 802b, deployment stage 802c) of the software development life cycle (SDLC) 802 of a system program, such as an option trading application. The SDLC 802 may include a set of (functional) testing 804, such as a unit testing 804a, a component level isolation testing 804b, an integration testing 804c, a system testing 804d, a failure recovery testing 804e, and performance testing 804f.

For quality assurance testing of a trading system, a functional testing approach may be used in which multidimensional and overlapping test coverage are stressed for accomplishing comprehensive testing. For example, such a multidimensional approach to functional testing uses static code analysis, unit level testing (e.g., unit testing 804a), component level isolation test (e.g., component level isolation testing 804b), component level integration testing (e.g., integration testing 804c), and system level testing (e.g., system testing 804d) to ensure comprehensive testing coverage of a software system. The functional testing approach may be applied to both new functionality as well as existing functionality. By applying the functional testing approach against existing functionality, for instance, a comprehensive regression testing can be conducted.

Static and dynamic code analysis may be performed to detect software issues, such as memory leaks, memory array overruns and threading issues. In addition, static code analysis can be used to examine software to profile its performance, examine the call tree (call stack) and provide insight into topics such as static and heap memory usage. In some embodiments, open source tools, such as Valgrind, CPPCheck, LCOV, Sonar and other software profiling tools are used for static or dynamic code analysis. For example, the Jenkins Continuous Integration open source tool (Jenkins) for continuous integration can be used to continuously build new releases of software and invoke a software profiling tool to conduct static and dynamic code analysis against the new releases of software. Jenkins is an open source tool (i.e., free software) that can provide continuous integration services for software development. The Jenkins application automatically reports the results of code analysis. If defects are discovered during code analysis, the QA team can segue into the Defect Management stage of the QA defect management process 800 to analyze and correct the identified defects. Once the identified defects are corrected, the software code is retested.

Unit testing 804a may be performed to test the algorithms and functionality at a basic software component level. Critical software components are tested at the unit level boundary (e.g., classes, methods) using tools, such as CppUnit, JUnit or Spock. Using these tools, unit testing 804a can be performed automatically and repeatedly each time a component is built. The Jenkins open source tool can be used to continuously build each component and execute its unit testing. The Jenkins open source tool can also automatically report the success and failure of all such builds and unit tests and archive the results. If defects 806 are discovered through the unit testing 804a, the QA team can segue into the Defect Management (e.g., Atlassian™ JIRA™) stage 808 of the QA defect management process 800 to analyze/report (808a), record (808b) and correct (808c) the identified defects 806. The JIRA bug and issue tracking tool can report, record and track all defects that are discovered through QA testing. Once the identified defects 806 are corrected, the software component is retested (810).

The source code of the software components may be maintained and managed by a source code management system 812, such as GIT source code management system. The source code management system 812 may maintain separate branches (development branch 812a, release branch 812b, master branch 812c) of source code repository for different SDLC stages. When the source code of a software component is modified and built, the source code management system 812 can trigger (814) retesting of the modified component.

Component level isolation testing 804b may be performed for critical software components at the system (e.g., application) level boundary (e.g., application process(es)). Component level testing 804b may utilize custom built components to test critical application components in isolation of all other application components in order to conduct automated and repeated controlled tests upon completion of each new build. If defects 806 are discovered through the component level isolation testing 804b, the QA team can segue into the Defect Management stage 808 of the QA defect management process 800 to analyze/report (808a), record (808b) and correct (808c) the identified defects 806. Once the identified defects 806 are corrected, the isolated software components are retested (810).

Integration testing 804c may be performed to ensure that coupled application components integrate properly at both the messaging domain as well as the logical transaction management domain. Integration testing 804c can be conducted in two approaches. One approach is automated integration testing for conducting repeatable test cases, and the other is manual testing for testing complex interacting system components that make the automated testing impractical. Manual integration tests are performed for complicated test scenarios such as, e.g., those involving external services that integrate with external organizations. If defects 806 are discovered through the integration testing 804c, the QA team can segue into the Defect Management stage 808 of the QA defect management process 800 to analyze/report (808a), record (808b) and correct (808c) the identified defects 806. Once the identified defects 806 are corrected, the integrated application components are retested (810).

System testing 804d may be performed to test the functionality of the pertinent system (e.g., a financial trading application) from the user experience perspective as well as to ensure its software functions in accordance with the associated systems requirements and trading rules. System testing 804d can be conducted in two approaches. One is automated system testing for taking a black box test approach to the system, and the other is manual testing. For automated system testing, a proprietary testing subsystem (e.g., Verification Subsystem 102) may be used. The Jenkins open source tool can be used to continuously execute verification subsystem and related test cases for the automated system testing.

Manual testing is conducted when the complexity of the interacting components makes the automation of such testing inordinately difficult or impractical, or when the system includes a user interface that requires manual interaction to verify its visual presentation and interactive behavior. A test plan outlining the manual test procedure can be produced for system tests that are manually executed. If defects 806 are discovered through the system testing 804c, the QA team can segue into the Defect Management stage 808 of the QA defect management process 800 to analyze/report (808a), record (808b) and correct (808c) the identified defects 806. Once the identified defects 806 are corrected, the system is retested (810).

Failure recovery testing 804e may be conducted on appropriate application level components to validate the recovery from various application and hardware system (e.g., server, network, etc.) level failure scenarios. Failure recovery testing 804e often involves manually intensive processes that entail operationally generated interventions to simulate various scenarios. If defects 806 are discovered through the failure recovery testing 804e, the QA team can segue into the Defect Management stage 808 of the QA defect management process 800 to analyze/report (808a), record (808b) and correct (808c) the identified defects 806. Once the identified defects 806 are corrected, the failed scenario(s) are retested (810).

Performance testing 804f is multifaceted and may involve both automated and manual performance testing. For automated performance testing, a proprietary performance testing tool (Speed Test) may be used to test the performance attributes of various aspects of the financial trading application, such as system throughput (e.g., messages per second throughput), latency (e.g., round trip time latency) and determinism for simulated customer activities (e.g., the standard deviation for each quoting interface in a scaled down simulated production environment). The Speed Test may use the Jenkins open source tool to automatically execute the performance tests and archive the performance test results.

If defects 806 (e.g., performance attributes falling below the required level) are discovered through the performance testing 804f, the QA team can segue into the Defect Management stage 808 of the QA defect management process 800 to analyze/report (808a), record (808b) and correct (808c) the identified defects 806. Once the identified defects 806 are corrected, the failed performance attributes are retested (810). Manual performance testing is performed where automated testing is impractical or inordinately difficult to implement. Similar to the automated performance testing, the goal of the manual performance testing is to measure the system performance in terms of system throughput, latency and determinism. All test results from the manual performance testing are manually recorded.

While certain configurations of structures have been illustrated for the purposes of presenting the basic structures of the present invention, one of ordinary skill in the art will appreciate that other variations which would still fall within the scope of the appended claims are possible and intended for inclusion within the scope and contemplation of the invention.

What is claimed is:

1. A method for testing a computerized trading system having a verification subsystem and one or more trading environments for performing trading of financial instruments, each of the trading environments having a communication network interface, storage memory, and a matching engine executed by a processor, the method comprising:

defining at least one use case, the at least one use case comprising one or more command lines, the at least one use case specifying at least one generic actor and at least one generic financial product;

retrieving, by the verification subsystem, the at least one defined use case;

parsing, by the verification subsystem, the command lines based on predefined parsing rules to produce parsed command lines, each parsed command line comprising a verb specifying at least one financial transaction and each parsed command line further comprising one or more fields, each field containing a parameter of the at least one specified financial transaction;

processing, by the verification system, the parsed command lines based on dynamic configurations of the trading system, the dynamic configurations comprising at least one of:

(i) settings associated with each of a plurality of operational modes of the trading system, and (ii) settings associated with entitlements for entities trading through the trading system, wherein the processing comprises:

mapping the verb and fields of each command line based on predefined mapping relationships; and specifying, at least one registered user of the trading system and at least one predetermined financial product currently trading on the trading system;

generating, by the verification subsystem, a test case based on the processing, wherein the generating comprises:

substituting, the at least one registered user for the at least one generic actor and the at least one predetermined financial product for the at least one generic product;

executing, by the verification subsystem, the test case, the executing comprising producing one or more messages to be executed by the trading system and one or more validations to be performed, wherein the executing of the test case further comprises:

transmitting, by the verification subsystem, the messages which are executed in the one or more trading environments of the trading system;

reading, by the verification subsystem, outputs of the trading system specified by the validations; and evaluating the read outputs based on values specified in the validations.

2. The method of claim 1, wherein the mapping by the verification subsystem comprises specifying a particular network connection in the messages such that a particular message is transmitted for execution via the specified network connection.

3. The method of claim 2, wherein the specified network connection is determined based on an identity of an actor specified in the use case.

4. The method of claim 2, wherein the particular message is executed by a particular trading environment corresponding to the specified network connection.

5. The method of claim 1, wherein the verb of the parsed command line is a macro-verb which is mapped to one of a plurality of atomic verbs and a combination of at least one atomic verb and at least one pseudo verb, each pseudo verb is mapped to an atomic verb and each atomic verb corresponds to a particular message to be executed by the trading system.

6. The method of claim 1, wherein the verb of the parsed command line is a pseudo-verb which is mapped to an atomic verb such that at least one field of the atomic verb is determined by the pseudo-verb, each atomic verb corresponding to a particular message to be executed by the trading system.

7. The method of claim 1, wherein the verb of the parsed command line is a multi-sided verb which is expanded by breaking into a sell side and a buy side and mapped to one of a sell side atomic verb and a sell side pseudo verb and one of a buy side atomic verb and a buy side pseudo verb, each corresponding to a particular message to be executed by the trading system.

8. The method of claim 1, wherein the values specified in the validations are included in the use case.

9. The method of claim 1, wherein at least a portion of the validations are based on a number of entitlements associated with a registered user, the entitlements corresponding to a number of network communication ports assigned to the registered user.

10. The method of claim 1, wherein the use case is stored in a spreadsheet file and the test case is generated as an XML script.

11. The method of claim 1, wherein the mapping by the verification system is performed based further on static environment configurations of the trading system.

12. The method of claim 11, wherein the static environment configurations include one or more of memory allocations, queue depths, and networking configurations of the trading system.

13. The method of claim 12, wherein the networking configurations of the trading system comprise Internet Protocol (IP) addresses and port numbers associated with fixed connections that are maintained by the trading system.

14. A system for testing a computerized trading system having and one or more trading environments for performing trading of financial instruments, each of the trading environments having a communication network interface, storage memory, and a matching engine executed by a processor, the system comprising:

a verification subsystem comprising a processor and a communication interface;

a memory, accessible by the verification subsystem, storing one or more defined use cases comprising one or more command lines, the one or more uses cases each specifying at least one generic actor and at least one generic financial product, wherein the verification subsystem is configured to perform:

parsing the command lines of a retrieved use case based on predefined parsing rules to produce parsed command lines, each parsed command line comprising a verb specifying at least one financial transaction and each parsed command line further comprising one or more fields, each field containing a parameter of the specified financial transaction;

processing the parsed command lines based further on dynamic configurations of the trading system, the dynamic configurations comprising at least one of: (i) settings associated with each of a plurality of operational modes of the trading system, and (ii) settings associated with entitlements for entities trading through the trading system, wherein the processing comprises:

mapping the verb and fields of each command line based on predefined mapping relationships; and specifying, at least one registered user of the trading system and at least one predetermined financial product currently trading on the trading system;

generating, by the verification subsystem, a test case based on the processing, wherein the generating comprises:

substituting, the at least one registered user for the at least one generic actor and the at least one predetermined financial product for the at least one generic product;

executing the test case, the executing comprising producing one or more messages to be executed by the trading system and one or more validations to be performed, wherein the executing of the test case further comprises:

transmitting the messages which are executed in the one or more trading environments of the trading system; and reading outputs of the trading system specified by the validations; and evaluating the read outputs based on values specified in the validations.

15. The system of claim 14, wherein the mapping by the verification subsystem comprises specifying a particular network connection in the messages such that a particular message is transmitted for execution via the specified network connection.

16. The system of claim 15, wherein the specified network connection is determined based on an identity of an actor specified in the use case.

17. The system of claim 14, wherein the use case specifies a generic financial product which is an object of the execution of the message, and the mapping by the verification subsystem further comprises specifying a registered user which is substituted for the generic product.

18. The system of claim 14, wherein the verb of the parsed command line is a macro-verb which is mapped to one of a plurality of atomic verbs and a combination of at least one atomic verb and at least one pseudo verb, each pseudo verb is mapped to an atomic verb and each atomic verb corresponds to a particular message to be executed by the trading system.

19. The system of claim 14, wherein the verb of the parsed command line is a pseudo-verb which is mapped to an atomic verb such that at least one field of the atomic verb is determined by the pseudo-verb, each atomic verb corresponding to a particular message to be executed by the trading system.

20. The system of claim 14, wherein the verb of the parsed command line is a multi-sided verb which is expanded by breaking into a sell side and a buy side and mapped to one of a sell side atomic verb and a sell side pseudo verb and one of a buy side atomic verb and a buy side pseudo verb, each corresponding to a particular message to be executed by the trading system.

21. A computer program product comprising a computer usable non-transitory medium having a computer readable program code embedded therein, the computer readable code including instructions for executing the steps of a method for testing a computerized trading system having a verification subsystem and one or more trading environments for performing trading of financial instruments, each of the trading environments having a communication network interface, storage memory, and a matching engine executed by a processor, the method comprising:

retrieving, by the verification subsystem, at least one defined use case, each defined use case comprising one or more command lines, the at least one use case specifying at least one generic actor and at least one generic financial product;

parsing, by the verification subsystem, the command lines based on predefined parsing rules to produce parsed command lines, each parsed command line comprising a verb specifying at least one financial transaction and each parsed command line further comprising one or more fields, each field containing a parameter of the specified financial transaction;

processing, by the verification system, the parsed command lines based further on dynamic configurations of the trading system, the dynamic configurations comprising at least one of: (i) settings associated with each of a plurality of operational modes of the trading system, and (ii) settings associated with entitlements for entities trading through the trading system, wherein the processing comprises:

mapping the verb and fields of each command line based on predefined mapping relationships; and specifying, at least one registered user of the trading system and at least one predetermined financial product currently trading on the trading system;

generating, by the verification subsystem, a test case based on the processing, wherein the generating comprises:

substituting, the at least one registered user for the at least one generic actor and the at least one predetermined financial product for the at least one generic product;

executing, by the verification subsystem, the test case, the executing comprising producing one or more messages to be executed by the trading system and one or more validations to be performed, wherein the executing of the test case further comprises:

transmitting, by the verification subsystem, the messages which are executed in the one or more trading environments of the trading system;

reading, by the verification subsystem, outputs of the trading system specified by the validations; and evaluating the read outputs based on values specified in the validations.

22. The computer program product of claim 21, wherein the mapping by the verification subsystem comprises specifying a particular network connection in the messages such that a particular message is transmitted for execution via the specified network connection.

23. The computer program product of claim 22, wherein the specified network connection is determined based on an identity of an actor specified in the use case.

24. The computer program product of claim 22, wherein the particular message is executed by a particular trading environment corresponding to the specified network connection.

25. The computer program product of claim 21, wherein the use case specifies a generic actor and the mapping by the verification subsystem further comprises specifying a registered user which is substituted for the generic actor.

26. The computer program product of claim 21, wherein the use case specifies a generic financial product which is an object of the execution of the message, and the mapping by the verification subsystem further comprises specifying a registered user which is substituted for the generic product.

* * * * *